(12) United States Patent
Becker et al.

(10) Patent No.: US 7,627,091 B2
(45) Date of Patent: Dec. 1, 2009

(54) UNIVERSAL EMERGENCY NUMBER ELIN BASED ON NETWORK ADDRESS RANGES

(75) Inventors: Gary Becker, Northglenn, CO (US); Robert F. Liston, Lopatcong, NJ (US); Sung H. Moon, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 1177 days.

(21) Appl. No.: 10/607,414

(22) Filed: Jun. 25, 2003

(65) Prior Publication Data

US 2005/0007999 A1    Jan. 13, 2005

(51) Int. Cl.
*H04M 11/00* (2006.01)
(52) U.S. Cl. .......................................... 379/37; 379/45
(58) Field of Classification Search ............... 379/45, 379/37, 38; 370/352
See application file for complete search history.

(56) References Cited

U.S. PATENT DOCUMENTS

| | | |
|---|---|---|
| 515,426 A | 2/1894 | French et al. |
| 4,074,069 A | 2/1978 | Tokura et al. |
| 4,275,385 A | 6/1981 | White |
| 4,446,454 A | 5/1984 | Pyle |
| 5,206,903 A | 4/1993 | Kohler et al. |
| 5,315,434 A | 5/1994 | Mizuno et al. |
| 5,461,390 A | 10/1995 | Hoshen |
| 5,515,426 A | 5/1996 | Yacenda et al. |
| 5,543,778 A | 8/1996 | Stouffer |
| 5,550,547 A | 8/1996 | Chan et al. |
| 5,555,376 A | 9/1996 | Theimer et al. |
| 5,558,013 A | 9/1996 | Blackstone, Jr. |
| 5,627,375 A | 5/1997 | Hsieh |
| 5,680,450 A | 10/1997 | Dent et al. |

(Continued)

FOREIGN PATENT DOCUMENTS

CN    1141567    1/1997

(Continued)

OTHER PUBLICATIONS

Khaled El-Maleh et al., "Comparison of Voice Activity Detection Algorithms for Wireless Personal Communications Systems," McGill University, Department of Electrical Engineering (1997), pp. 1-26.

(Continued)

*Primary Examiner*—Stella L Woo
(74) *Attorney, Agent, or Firm*—Sheridan Ross P.C.

(57) ABSTRACT

A method for providing emergency location information to an emergency service provider is provided. The method, in one implementation, includes the steps of (a) providing a plurality of sets (e.g., ranges) of OSI Layer 3 or Network Layer addresses; (b) receiving an emergency call from a calling device having an OSI Layer 3 or Network Layer address; (c) mapping the calling address against the plurality of sets of addresses to determine an ELIN for the calling address; and (d) forwarding the ELIN to a public safety answer point. Each set of addresses comprises a plurality of addresses, and a plurality of ELINs corresponds to the plurality of sets of addresses. In each set of addresses, a corresponding one of the plurality of ELINs is typically common to a plurality of addresses.

42 Claims, 4 Drawing Sheets

U.S. PATENT DOCUMENTS

| | | | |
|---|---|---|---|
| 5,689,548 | A | 11/1997 | Maupin et al. |
| 5,742,666 | A | 4/1998 | Alpert |
| 5,748,083 | A | 5/1998 | Rietkerk |
| 5,793,861 | A | 8/1998 | Haigh |
| 5,805,999 | A | 9/1998 | Inoue |
| 5,828,747 | A | 10/1998 | Fisher et al. |
| 5,844,262 | A | 12/1998 | Ooishi |
| 5,884,262 | A | 3/1999 | Wise et al. |
| 5,905,659 | A | 5/1999 | Rose |
| 5,905,793 | A | 5/1999 | Flockhart et al. |
| 5,960,061 | A | 9/1999 | Fahie et al. |
| 5,982,873 | A | 11/1999 | Flockhart et al. |
| 6,046,683 | A | 4/2000 | Pidwerbetsky et al. |
| 6,067,017 | A | 5/2000 | Stewart et al. |
| 6,069,570 | A | 5/2000 | Herring |
| 6,076,121 | A | 6/2000 | Levine |
| 6,100,806 | A | 8/2000 | Gaukel |
| 6,104,288 | A | 8/2000 | Hopkins |
| 6,104,711 | A | 8/2000 | Voit |
| 6,173,053 | B1 | 1/2001 | Bogart et al. |
| 6,192,122 | B1 | 2/2001 | Flockhart et al. |
| 6,236,313 | B1 | 5/2001 | Eskildsen et al. |
| 6,236,365 | B1 | 5/2001 | LeBlanc et al. |
| 6,249,227 | B1 | 6/2001 | Brady et al. |
| 6,265,963 | B1 | 7/2001 | Wood, Jr. |
| 6,275,794 | B1 | 8/2001 | Benyassine et al. |
| 6,282,574 | B1 | 8/2001 | Voit |
| 6,310,549 | B1 | 10/2001 | Loftin et al. |
| 6,359,880 | B1 | 3/2002 | Curry et al. |
| 6,362,778 | B2 | 3/2002 | Neher |
| 6,377,203 | B1 | 4/2002 | Doany |
| 6,400,265 | B1 | 6/2002 | Saylor et al. |
| 6,449,358 | B1 | 9/2002 | Anisimov et al. |
| 6,453,291 | B1 | 9/2002 | Ashley |
| 6,456,964 | B2 | 9/2002 | Manjunath et al. |
| 6,463,607 | B2 | 10/2002 | Hartmann |
| 6,486,780 | B1 | 11/2002 | Garber et al. |
| 6,496,806 | B1 | 12/2002 | Horwitz et al. |
| 6,504,838 | B1 | 1/2003 | Kwan |
| 6,505,780 | B1 | 1/2003 | Yassin et al. |
| 6,559,620 | B2 | 5/2003 | Zhou et al. |
| 6,580,908 | B1 | 6/2003 | Kroll et al. |
| 6,600,443 | B2 | 7/2003 | Landt |
| 6,650,901 | B1 | 11/2003 | Schuster et al. |
| 6,661,340 | B1 | 12/2003 | Saylor et al. |
| 6,678,357 | B2 | 1/2004 | Stumer et al. |
| 6,687,609 | B2 | 2/2004 | Hsiao et al. |
| 6,687,668 | B2 | 2/2004 | Kim et al. |
| 6,694,787 | B1 | 2/2004 | Brown |
| 6,705,522 | B2 | 3/2004 | Gershman et al. |
| 6,707,383 | B2 | 3/2004 | Flaherty |
| 6,707,903 | B2 | 3/2004 | Burok et al. |
| 6,757,359 | B2 | 6/2004 | Stumer et al. |
| 6,759,957 | B2 | 7/2004 | Murakami et al. |
| 6,763,231 | B2 | 7/2004 | Takatori et al. |
| 6,778,084 | B2 | 8/2004 | Chang et al. |
| 6,778,096 | B1 | 8/2004 | Ward et al. |
| 6,804,329 | B2 | 10/2004 | Geck et al. |
| 6,825,767 | B2 | 11/2004 | Humbard |
| 6,847,892 | B2 | 1/2005 | Zhou et al. |
| 6,892,052 | B2 | 5/2005 | Kotola et al. |
| 6,898,434 | B2 | 5/2005 | Pradhan et al. |
| 6,901,255 | B2 | 5/2005 | Shostak |
| 6,907,238 | B2 | 6/2005 | Leung |
| 6,965,313 | B1 | 11/2005 | Saylor et al. |
| 6,972,682 | B2 | 12/2005 | Lareau et al. |
| 6,983,124 | B1 | 1/2006 | Bayley et al. |
| 6,989,750 | B2 | 1/2006 | Shanks et al. |
| 6,990,328 | B2 | 1/2006 | Crandall et al. |
| 6,996,402 | B2 | 2/2006 | Logan et al. |
| 7,005,985 | B1 | 2/2006 | Steeves |
| 7,015,817 | B2 | 3/2006 | Copley et al. |
| 7,030,731 | B2 | 4/2006 | Lastinger et al. |
| 7,030,761 | B2 | 4/2006 | Bridgelall et al. |
| 7,036,729 | B2 | 5/2006 | Chung |
| 7,040,532 | B1 | 5/2006 | Taylor et al. |
| 7,042,359 | B2 | 5/2006 | Clucas |
| 7,068,148 | B2 | 6/2006 | Shanks et al. |
| 7,084,740 | B2 | 8/2006 | Bridgelall |
| 7,088,242 | B2 | 8/2006 | Aupperle et al. |
| 7,113,090 | B1 | 9/2006 | Saylor et al. |
| 7,123,149 | B2 | 10/2006 | Nowak et al. |
| 7,126,470 | B2 | 10/2006 | Clift et al. |
| 7,130,385 | B1 | 10/2006 | Moon |
| 7,135,977 | B2 | 11/2006 | Burg et al. |
| 7,149,503 | B2 | 12/2006 | Aarnio et al. |
| 7,155,238 | B2 | 12/2006 | Katz |
| 7,183,907 | B2 | 2/2007 | Simon et al. |
| 7,202,783 | B2 | 4/2007 | Want et al. |
| 7,209,771 | B2 | 4/2007 | Twitchell, Jr. |
| 7,212,829 | B1 | 5/2007 | Lau et al. |
| 7,228,429 | B2 | 6/2007 | Monroe |
| 7,257,108 | B2 | 8/2007 | Cheston et al. |
| 7,262,690 | B2 | 8/2007 | Heaton et al. |
| 7,266,347 | B2 | 9/2007 | Gross |
| 7,274,909 | B2 | 9/2007 | Perttila et al. |
| 7,280,833 | B2 | 10/2007 | Suda et al. |
| 7,330,464 | B2* | 2/2008 | Brouwer et al. ............ 370/352 |
| 7,333,479 | B2 | 2/2008 | Jalkanen et al. |
| 7,373,109 | B2 | 5/2008 | Pohja et al. |
| 7,378,956 | B2 | 5/2008 | Nam et al. |
| 2002/0005894 | A1 | 1/2002 | Foodman et al. |
| 2002/0103636 | A1 | 8/2002 | Tucker et al. |
| 2002/0136364 | A1* | 9/2002 | Stumer et al. ................ 379/45 |
| 2002/0165711 | A1 | 11/2002 | Boland |
| 2002/0173328 | A1 | 11/2002 | Min |
| 2003/0104800 | A1 | 6/2003 | Zak |
| 2003/0227540 | A1 | 12/2003 | Monroe |
| 2004/0002305 | A1 | 1/2004 | Byman-Kivivuori et al. |
| 2004/0029558 | A1 | 2/2004 | Liu |
| 2004/0095238 | A1 | 5/2004 | Beere |
| 2004/0134984 | A1 | 7/2004 | Powell et al. |
| 2004/0142678 | A1 | 7/2004 | Krasner |
| 2004/0186768 | A1 | 9/2004 | Wakim et al. |
| 2004/0203352 | A1 | 10/2004 | Hall et al. |
| 2004/0203944 | A1 | 10/2004 | Huomo et al. |
| 2005/0048988 | A1 | 3/2005 | Gentle |
| 2005/0063519 | A1 | 3/2005 | James |
| 2005/0083911 | A1 | 4/2005 | Grabelsky et al. |
| 2005/0088299 | A1 | 4/2005 | Bandy |
| 2005/0110612 | A1 | 5/2005 | Carrender |
| 2005/0128295 | A1 | 6/2005 | Addy |
| 2006/0028352 | A1 | 2/2006 | McNamara et al. |
| 2006/0094405 | A1 | 5/2006 | Dupont |
| 2006/0120517 | A1 | 6/2006 | Moon et al. |
| 2006/0121916 | A1 | 6/2006 | Aborn et al. |
| 2006/0158310 | A1 | 7/2006 | Klatsmanyi et al. |
| 2006/0177071 | A1 | 8/2006 | Eskildsen |
| 2006/0181401 | A1 | 8/2006 | Martin |
| 2006/0219473 | A1 | 10/2006 | Boland et al. |

FOREIGN PATENT DOCUMENTS

| | | |
|---|---|---|
| EP | 0899673 | 3/1999 |
| EP | 0998108 | 5/2000 |
| EP | 1091307 | 4/2001 |
| EP | 1150236 | 10/2001 |
| EP | 1324255 | 7/2003 |
| GB | 2298106 | 8/1996 |
| JP | H08-191311 | 7/1996 |
| JP | 2002-250768 | 9/2002 |
| JP | 2004013789 | 1/2004 |
| JP | 2004-242274 | 8/2004 |
| JP | 2004-318283 | 11/2004 |

| | | |
|---|---|---|
| WO | 01/95642 | 12/2001 |
| WO | WO 01/94967 | 12/2001 |
| WO | WO 02/44865 | 6/2002 |
| WO | 2004/092999 | 10/2004 |
| WO | WO 2005001669 | 1/2005 |

OTHER PUBLICATIONS

Nikos Doukas et al., "Voice Activity Detection Using Source Separation Techniques", Signal Processing Section, Dept. of Electrical Engineering, Imperial College, UK, four (4) pages; undated.

Active Campus Tutorial by David Casteron dated Oct. 11, 2003, downloaded from http://activecampus-dev.ucsd.edu/ntutorial/main.htm on Apr. 12, 2005.

AIM, RFID.ORG, Searching for RRID Information, available at http://www.aimglobal.org/technologies/rfid, 3 pages.

Applied Generics Technical Report "NERO24 Mobile Location System (GSM Edition)," Version 1.0 (2004), pp. 1-27.

Location Based Services downloaded from http://www.ericsson.com/telecomreport/article.asp?aid=34&tid=tid=201&ma=1&msa=3 on Apr. 12, 2005.

Mobile in a Minute downloaded from www.mobilein.com/location_based_services.htm on Apr. 12, 2005.

Newsweek, An Internet of Things—Is RFID the Mark of Satan . . . , available at http://msnbc.msn.com/id/3068871, 4 pages (Jun. 10, 2004).

Project Mayhem by Phillip Dressen, James Gillespie, Benjamin Hoyt and Simone Nicolo, downloaded from http://www.cs.colorado.edu/upgrad/seniorproject/projects/projectmahhem.html on Apr. 12, 2005.

RFID Journal, Frequently Asked Questions, Manufacturing, available at http://www.rfidjournal.com/article/articleview/207, 7 pages.

RFID, Tracking Everything, Everywhere, by Katherine Albrecht, available at http://www.stoprfid.org/rfid_overview.htm, 7 pages.

RFID, Wikipedia, the free encyclopedia, available at http://en.wikipedia.org/wiki/RFID, 3 pages (Updated May 31, 2004).

The Denver Post, Bar Code Meets Its Match, Section C, (Jun. 3, 2004), p. 1C and 8C.

Time Online Edition, Global Business—The See-It-All Chip, available at http://www.time.com/time/globalbusiness/article/0,9171,1101030922-485764-3,00.html, 3 pages (Sep. 22, 2003).

Wired News, Radio ID Tags: Beyond Bar Codes, available at http://www.wired.com/news/technology/0,1282,52343,00.html, 3 pages (May 20, 2002).

WYSE, RFID, available at http://searchnetworking.techtarget.com/sDefinition/0,,sid7_gci805987,00.html, 2 pages (updated Jan. 16, 2004).

Avaya "Administrator's Guide for Avaya Communication Manager: vols. 1, 2, and 3," 555-533-506, Issue 7 (Nov. 2003), pp. 121, 129, 886, 889, 1169, 1193, 1555.

Comments of Nortel Networks, Before the Federal Communications Commission, WC Docket No. 04-36, May 28, 2004, pp. 1-22 with Appendices 1-4.

RedSky Technologies, Inc.; "Welcome to RedSky's E-911 Business Watch", E-911 Business Watch, Issue 4 (Oct. 21, 2003), 5 pages.

Schulzrinne, "Providing Emergency Call Services for SIP-based Internet Telephony", Available at: http://www.iptel.org/info/players/ietf/location/draft-schulzrinne-sip-911--00.txt, Jul. 2000, pp. 1-14.

Cisco Systems, Inc., *Cisco Emergency Responder Version 1.1* (Oct. 2001), 5 pages.

Avaya: Communication without Boundaries, *Solving the Challenges of E911 Service with Avaya IP Telephony Networks*, White Paper, Nov. 2002, Issue 1.1, 10 pages.

Cisco Data Sheet, *Cisco Emergency Responder Version 1.1.*, Jul. 20, 2002, available at http://www.cisco.com/warp/public/cc/pd/unco/cer/prodlit/emerg_ds.htm, 7 pages.

Cisco, *Cisco Emergency Responder*, printed Feb. 11, 2003, available at http://www.cisco.com/warp/public/cc/pd/unco/cer/, 2 pages.

EIA Telecommunications Industry Association, *TIA Telecommunications Systems Bulletin: Telecommunications—IP Telephony Infrastructures—IP Telephony Support for Emergency Calling Service*, TSB-146, Mar. 2003, pp. 1-30.

"Perimeter Security Sensor Technologies Handbook," available at http://www.nlectc.org/perimetr/full2.htm, 104 pages; printed Feb. 2, 2005.

"Providing E911 services for Nortel VoIP", available at http://www.bytesnwords.com/clients/qovia/website/products/pr_overview_nortel.htm, Copyright 2004-2006 (printed Sep. 22, 2008), 1 page.

Lee, "Analysis: Verizon's VoIP patents drop dime on need for reform", available at http://arstechnica.com/news.ars/post/20070425-analysis-verizons-voip-patents-drop-dime-on-need-for-reform.html, pp. 1-3, Apr. 25, 2007.

\* cited by examiner

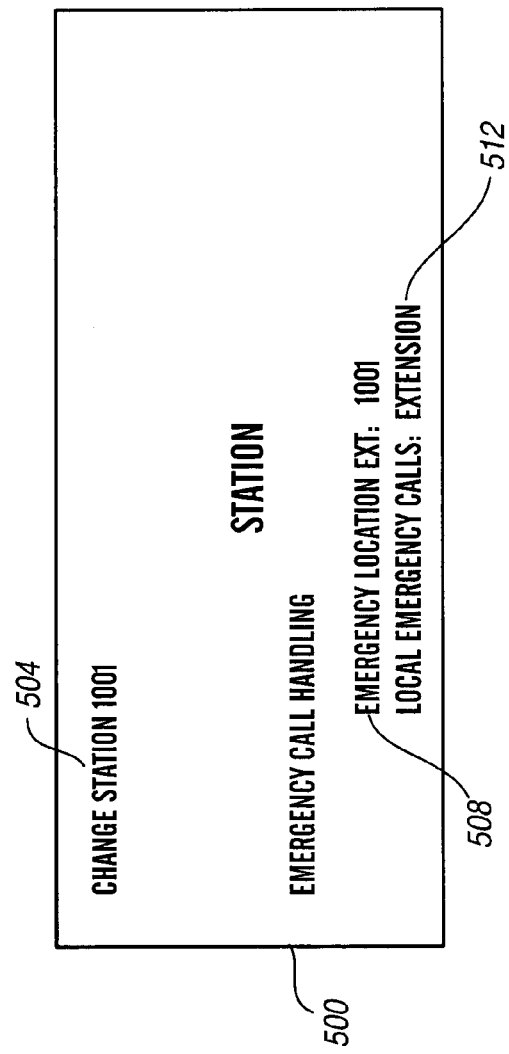

UNIVERSAL EMERGENCY NUMBER ELIN BASED ON NETWORK ADDRESS RANGES

FIELD OF THE INVENTION

The present invention is directed generally to emergency assistance call handling and specifically to emergency assistance call handling in a distributed processing network.

BACKGROUND OF THE INVENTION

Local regulations, as well as concerns about public safety and liability, require enterprises to provide employees and visitors with an effective means to reach a universal emergency number (e.g., 911 in the U.S., 000 in Australia, and 112 in the European Community) operator in an emergency. The call routes through the local central office, through a switch, to the appropriate Public Safety Answer Point (PSAP), where the call is answered. Each PSAP covers one city or one rural community. At the PSAP, emergency operators determine the nature of the emergency and contact the appropriate agency: typically police, fire, or emergency medical services. A single PSAP is typically responsible for an area covering several independent police and fire departments in the U.S.

With Enhanced 911 (E911), the calling party number, known as an Emergency Location Information Number (ELIN), is sent with the emergency call over Centralized Automatic Message Accounting (CAMA) trunks or via the calling number information element over Integrated Services Digital Network (ISDN) trunks. A suitably configured module at the PSAP uses the ELIN to lookup the caller's documented street address location from the Automatic Location Information (ALI) database.

To allow operators at the PSAP to call back a caller, IP communication systems use Public Switched Telephone Network (PSTN)-based methods to send an ELIN that identifies the telephone number for an extension from which the emergency call was dialed. If the extension number is not public, premise-based communications systems can be programmed to send an ELIN that is located nearby the calling extension. This is typically done by setting up the Local Area Network (LAN)-based telephony system itself, a media gateway, or a separate server, to automatically send a properly formatted number, such as the public telephone number. To deliver this information to the public emergency services network, the information can be encoded over analog CAMA (which requires an 8-digit ELIN), or over digital ISDN trunks (which require a 10-digit ELIN).

The above schemes assume that a calling party number or ELIN always corresponds to the street address in the ALI database. This assumption is not always true in practice. Adds, moves, and changes occur frequently in a dynamic enterprise communications environment. IP Telephony enables end users to relocate automatically their telephones to any location that can access the Wide Area Network (WAN). For example, H.323 IP telephone users can move telephones without notifying the system administrator of the move and Session Initiation Protocol (SIP) telephone users can use the same extension number at several different telephones simultaneously. If the users of such telephones dial a universal emergency number, emergency response personnel may go to the wrong physical location.

To address this problem, Cisco Systems™ has introduced the Emergency Responder™. The operation of the Emergency Responder will be discussed with reference to FIG. 1. A communications system comprises a switch 100, an emergency responder 104, a first Ethernet switch 108 in a first subnet 112 and having a plurality of ports 116a-n connected to a plurality of telephones 120-1 to -N, and a second Ethernet switch 122 in a second subnet 124 and also having a plurality of ports 128a-n, all of which are connected by a network 132. As used herein, a "subnetwork" or "subnet" refers to a network segment. The emergency responder 104, at predetermined time intervals, queries the switch 100 (or Ethernet switches directly) for new phone and user login registration events. In response to reported events, the emergency responder queries the various Ethernet switches in the network 132 to determine the location of the telephone and the user, based on the switch port to which the phone is attached. The location, which is based on the Open Systems Interconnect (OSI) Layer 2 (or Data Link Layer) port address, is then updated in an emergency responder location database (not shown). Thus, if telephone 120-2 is moved from port 116b of the first Ethernet switch 108 to port 128b of the second Ethernet switch 122 (as shown by the dotted lines), the emergency responder will, in response to periodic queries of the switch 100, determine that the telephone has moved. The responder then must query each and every Ethernet switch in the same subnetwork to determine to which port the telephone has been moved. When an emergency call is placed, the switch queries the emergency responder for location information associated with the call. In response to the query, the emergency responder locates and transmits the requested information to the switch, which then forwards the information along with the call. The location is the ELIN of a real or virtual phone that has a port close to the physical location of the port of the calling phone and has a street address that is known to be correctly entered in the ALI database. When an emergency call is dropped, any calls to the ELIN are forwarded automatically for a predetermined period of time to the device originating the dropped call.

The methodology employed by the Emergency Responder™ has been embodied in TSB-146, Telecommunications—IP Telephony Infrastructures—IP Telephony Support, Emergency Calling Service, formulated under the cognizance of TIA Subcommittee TR-41.4, IP Telephony Infrastructure and Interworking Standards ("TIA Standard"). The TIA Standard requires connectivity between the IP communication device (shown in FIG. 1 as the telephones), the switch/server (called "call agent or server" in the standard and shown in FIG. 1 as the switch, an adjunct called the "Location Information Server" (shown in FIG. 1 as the emergency responder), and Simple Network Management Protocol (SNMP) ports on every data switch (shown in FIG. 1 as the first and second Ethernet switches) in the same subnet as the IP communication device.

The approach of the Emergency Responder™ and the TIA Standard can have a number of drawbacks. For example, the emergency responder, due primarily to the time required to learn of the change from the switch (due to the polling interval), is unable to collect location information on a real time basis. It is thus possible that, if a telephone is moved to another ethernet switch and dials an emergency call before the emergency responder is able to ascertain the new location of the telephone, emergency personnel will be sent to an incorrect location (which in FIG. 1 is associated with the first subnet rather than the second subnet). The likelihood of this happening depends on the duration of the polling interval of the Ethernet switches by the responder 104. As will be appreciated, switch queries are done neither too frequently as the network will be flooded with traffic nor too infrequently as a user might make an emergency call before the emergency responder recognizes the user's IP telephone has moved. Because the emergency responder 104 is queried during an emergency call for location information, there is a possibility that ELIN information may not be provided to the emergency provider, that the emergency call will be delayed until the information is received, or that an incorrect ELIN (such as a default ELIN) may be provided. Not only is there a time delay in obtaining the information, namely the switch 100 must send a query through network 132 to the responder 104 and then the responder 104 must send a response through the network 132 to the switch 100 but also the location information is not accessible if the emergency responder cannot be contacted for some reason. For example, the emergency responder or a link on a communication path to/from the responder may malfunction.

SUMMARY OF THE INVENTION

These and other needs are addressed by the various embodiments and configurations of the present invention. The present invention is generally directed to a system and method for providing location information associated with an emergency caller to emergency service personnel, such as police, fire, and medical personnel, by assigning location information to sets or ranges of addresses.

In one embodiment of the present invention, a method for providing emergency location information to an emergency service provider is set forth. The method includes the steps of:
(a) providing a plurality of sets of OSI Network Layer addresses, each set of addresses comprising a plurality of addresses, and a plurality of ELINs corresponding to the plurality of sets of addresses and
(b) upon the occurrence of a predetermined event, mapping a selected address against the plurality of sets of addresses to determine an ELIN for the selected address. A number of sets of ELINs correspond to the sets of addresses. A corresponding one of the ELINs is typically common to a number of the member addresses in each set of addresses. In one configuration, the "members" of the set of addresses refer to the addresses included within the range of addresses defined by the set while the "members" of the set of ELINs refer to the extensions included within the set. Commonly, each set of addresses contains many member addresses and corresponds to one ELIN. This provides a many-to-one correspondence between member addresses and ELINs. It is possible, however, that a set of addresses could have only one member address, which would provide a one-to-one correspondence between member addresses and ELINs.

The predetermined event can be any of a number of events. The predetermined event can, for example, be the receipt of an emergency call, the registration or attempted registration of a communication device, or the duration of time since emergency location information has been received from one or more other system components, such as a switch/server.

In one configuration, the method is implemented during an emergency call and the ELIN or another suitably formatted number is forwarded to a public safety answer point. As will be appreciated, the "public safety answer point" refers typically to the location that answers a public network emergency call.

In one configuration, each range of addresses defines a subnetwork. The addresses are typically selected such that each set defines a suitably sized emergency response location.

The methodology of the present invention can have a number of advantages compared to conventional systems. For example, the methodology of the present invention requires connectivity only between the communication device and the switch/server. This can be a reliability and traffic load advantage compared to conventional systems, such as Emergency Responder™ and the TIA Standard. While the approach of the Emergency Responder™ and TIA standard locates an IP communication device by OSI Layer 2 port, the methodology of the present invention preferably locates an endpoint per subnet or OSI Layer 3 (or Network Layer) address. For remote users, the location of a communication device by OSI Layer 2 port can be a disadvantage as remote users may tunnel into a wrong port causing the switch/server to report the wrong geographical location for the user. The methodology of the present invention also can update a communication device's location instantly. The Emergency Responder™ and TIA standard, by contrast, update a communication device's location only after the next periodic SNMP query.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 4 is a format of the emergency location table according to an embodiment of the present invention; and FIG. 5 is a format of an emergency station form according to an embodiment of the present invention.

DETAILED DESCRIPTION

The Emergency Location System

The invention will be illustrated below in conjunction with an exemplary communication system. Although well suited for use with, e.g., a system having a private branch exchange (PBX) or other similar contact processing switch or server, the invention is not limited to use with any particular type of communication system switch or server or configuration of system elements. Those skilled in the art will recognize that the disclosed techniques may be used in any communication application in which it is desirable to provide improved caller location. The term "contact" or "call" as used herein is intended to include not only telephone calls but also non-telephonic communications, such as data transmissions such as electronic mail, voice-over-IP, instant messaging, teletypewriter (TTY), facsimile, etc., whether circuit switched or packet switched.

Figure 1:
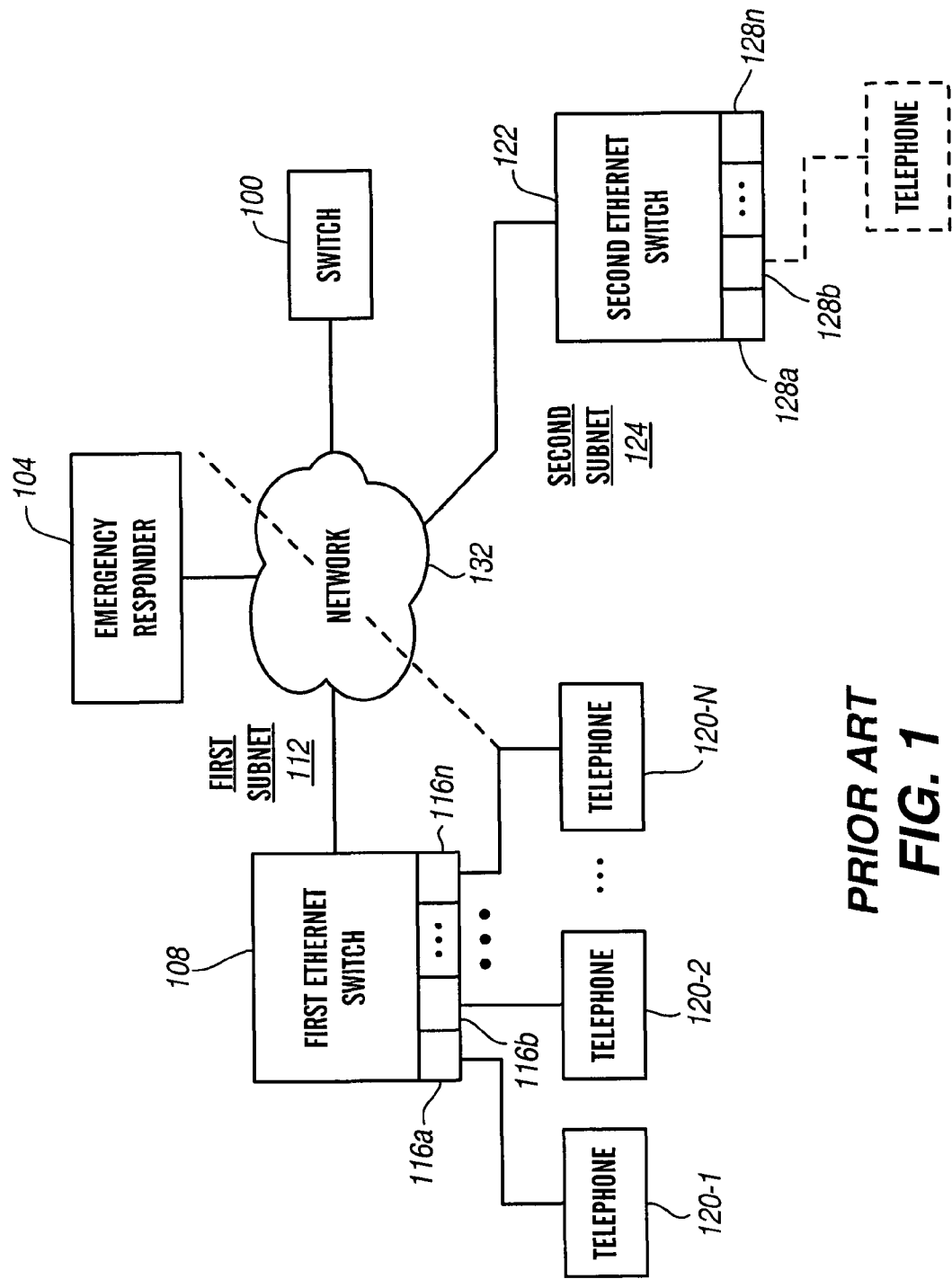
FIG. 1 is a block diagram of a prior art emergency locating infrastructure.
Figure 2:
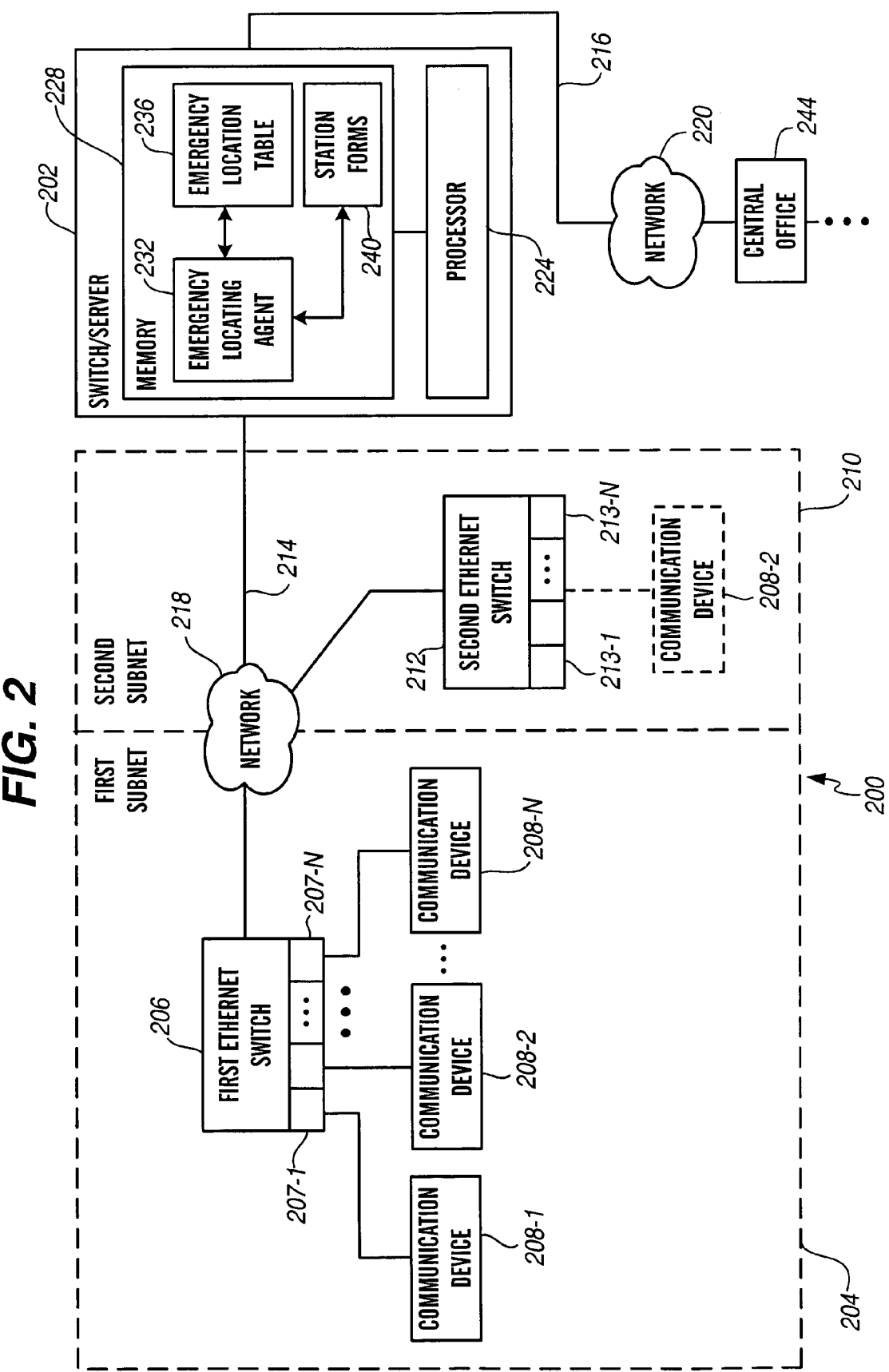
FIG. 2 is a block diagram of an emergency locating infrastructure according to an embodiment of the present invention.

FIG. 2 shows an exemplary communication system 200 in which the invention is implemented. The system 200 includes a switch/server 202 which serves a first subnet 204 and second subnet 210. Each subnet comprises a number of (Ethernet) switches 206 and 212, respectively. Each switch 206 and 212 is connected (via ports 207-1 to 207-N for switch 206 and ports 213-a to 213-N for switch 212) to and serves a number of communication devices (such as communication devices 208-1, 208-2, . . . 208-N for switch 206) that are registered with the switch/server 202. "Registration" is a process by which a communication device is made known to a switch/server. As will be appreciated, the registration can be performed by any technique or according to any protocol (e.g., such as H.323, SIP, 802.11, digital port initialization, and the like) and may by effected by the system administrator and/or through another suitable manual or automated technique. Each of the communication devices may be wired desktop telephone terminals or any other type of wired or wireless device capable of communicating with the switch/server. The word "communication device" as used herein should therefore be understood to include not only wired or wireless desktop telephone terminals but also other types of processor-based communication devices, including without limitation mobile telephones, IP telephones, IP softphones, IP hardphones, personal computers, personal digital assistants (PDAs), TTY Teletype, etc.

The terms "switch" or "server" as used herein should be understood to include a PBX, an enterprise switch, or other type of telecommunications system switch, as well as other types of processor-based communication control devices such as servers, computers, adjuncts, etc. By way of example, the switch/server in the exemplary embodiment may be implemented as an otherwise conventional DEFINITY™ or MULTIVANTAGE™ Enterprise Communication Service (ECS) communication system switch available from Avaya Inc. Other types of known switches/servers are well known in the art and therefore not described in detail herein.

The switch/server is coupled via one or more communication lines 214 and 216 to networks 218 and 220, respectively. In one configuration, the communication line 214 and network 218 are packet switched while the communication line 216 is a circuit-switched trunk line and the network 220 is the public switched telephone network (PSTN). Network 214, in one configuration, is a data or distributed processing network, such as the Internet and applies the TCP/IP suite of protocols. The lines carry incoming and outgoing contacts from the networks to the switch/server for processing. Preferably, the networks or other transit networks between the user's communication device and the switch/server and between the central office and the switch/server are configured such that the switch receives not only the intended destination address but also the source address or identity of the communication device initiating the contact. In one configuration, the communication medium 216 a Centralized Automatic Message Accounting (CAMA) or Integrated Services Digital Network (ISDN) trunk.

It should be noted that the invention does not require any particular type of information transport medium between the switch/server and the communication devices, i.e., the invention may be implemented with any desired type of transport medium as well as combinations of different types of transport media and with any desired type of network connection.

The switch/server 202 is in communication via network 220 with a central office 244. The central office 244 routes calls to a universal emergency number to a switch (not shown), which in turn routes the call to the appropriate Public Safety Answer Point (PSAP) (not shown), where the call is answered. The Emergency Location Information Number (ELIN) is sent by conventional techniques with the emergency call over the communication medium 216, such as via CAMA or via ISDN as the calling number information element. A suitably configured module (not shown) at the PSAP uses the ELIN to lookup the caller's documented street address location from the Automatic Location Information (ALI) database (not shown).

It should be emphasized that the configuration of the switch/server, communication devices, and other elements as shown in FIG. 2 is for purposes of illustration only and should not be construed as limiting the invention to any particular arrangement of elements.

The switch/server includes a processor 224 and a memory 228. The processor may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The processor operating in conjunction with the memory executes one or more software programs depicted in FIG. 2 as the emergency locating agent 232 and accesses various data structures in memory and/or an associated (separate) database depicted in FIG. 2 for purposes of simplicity as the emergency location table 236 and station forms 240 in memory 228. When a call to a universal emergency number is received from a registered communication device, the emergency locating agent 232 accesses ELIN information and determines, for the calling communication device, the appropriate ELIN (possibly in place of the actual calling party number) to forward to the central office. As discussed in detail below, the emergency location table 236 contains pre-assigned ELINs per designated range of OSI Layer 3 (or Network Layer) addresses (which are shown as being Internet Protocol (IP) addresses), and one or more station forms 240 are maintained to reflect relocations of communication devices which are known to system administration and which therefore need not be looked up in the emergency location table. To allow public safety personnel to call back a caller who has hung up, calls to the ELIN will be automatically forwarded within a pre-designated time interval to the caller.

The term "form" or "table" should be understood to include any ordered set of information or data stored in memory or other storage device accessible to the switch. The invention does not require that the information be stored in any particular length or format, e.g., a tabular format, a closed- or open-set, or location and numerous suitable storage formats and storage locations will be readily apparent to those skilled in the art.

The switch/server may include additional elements that are omitted from FIG. 2 for simplicity and clarity of illustration. For example, the switch/server may include an external database to store system configuration information, service circuits such as tone generators, announcement circuits, etc., and a port card for each type of user communication device associated therewith. Also associated with the switch/server may be an administrator terminal (not shown) which is used to program the operation of the switch/server during system administration, e.g., an initial set-up and configuration of the system of a subsequent system-level or user-level configuration. Other devices not shown in the figures may be associated with the switch/server, such as an adjunct feature server. Such an adjunct server may be physically incorporated within the switch/server and may be partially or completely implemented using other switch/server elements such as the processor 224 and memory 228.

The Emergency Location Table

Referring to FIG. 4, the emergency location table will now be discussed. The table 400 includes the following fields: a field 404 providing a beginning IP address, a field 408 providing an ending IP address (which along with the beginning IP address defines a subnetwork), a field 412 providing a corresponding subnet or mask identifier, and a field 424 providing a corresponding ELIN. The subnet or mask identifier typically is a special network address used to identify a specific subnetwork. Using a unique bit combination, a mask commonly partitions an address into a network ID and a host ID. As will be appreciated, the beginning and ending IP addresses can be defined based on any suitable protocol or subnetworking technique for dividing a network into subnetworks and is not limited to the Internet Protocol. The administrator fills out the various fields in the table for every communication device connector (e.g., IP data jack) in an administered data network. Once completed, neither the administrator nor the switch/server will typically modify the table unless the physical location is rewired.

The switch/server assigns an ELIN for the corresponding subnetwork. In ISDN, the ELIN is referred to as the location identification number. The field is not limited to extensions on the local switch/server. As will be appreciated, the range of addresses from which the emergency location address is derived can be an ELIN a telephone address, a port address, and any other type of electronic address. Examples of extensions include a hunt group, an automatic call distribution group, a vector directory number, a listed directory number, and the like. As will be appreciated, the extension may correspond not only to a real (physical) phone but also a virtual phone.

The ELIN may be for a different communication device than the particular device placing an emergency call. Generally, the ELIN is selected such that the physical location of the extension does not change and the extension's physical location is close to the physical locations of the various communication devices in the subnet defined by the corresponding range of addresses. For example, if extension 1234 has a physical location nearby extension 1111, the ELIN for extension 1234 could be extension 1111. In this example, extension 1234 is either newly moved by the end user or else is not in the ALI database.

The physical area served by the ELIN is referred to as the emergency response location. For circuit switched telephones, the emergency response location is typically a relatively small area, such as a desktop. For packet switched networks such as IP networks, the emergency response location is typically one subnetwork. The required maximum size of the emergency response location may be defined by state or local law. The National Emergency Number Association recommends that the emergency response location be somewhere between 7,000 and 40,000 square feet. Although the present invention is described with reference to subnetworks or subnets, the emergency response location may be defined as a smaller area depending on the application.

The ELIN is not required to be an extension on switch/server 202. For example, if an enterprise network includes several switches/servers co-located or if a user travels cross-country, the ELIN administered into the table and/or form can be an extension supported by a different switch/server.

If a communication device to be used for physical location is behind a Network Address Translation (NAT) device, the is based on the device's translated IP address and not the native IP address. If the user is using NAT, the NAT device will need to preserve subnetwork designations. The emergency locating agent expects a move from one geographic area to another to require a change in IP addresses. For example a system has first and second subnets as shown in FIG. 2, with the first subnet being 1.1.1.* and the second subnet being 2.2.2*. As will be appreciated, the "*" symbol is a wild card character. The subnets are mapped to two different ELINs in the emergency location table, and both of the subnets sit behind a NAT device. If the NAT device mapped both 1.1.1.* and 2.2.2.* into addresses in the range 3.3.3.*, the agent would not detect a move of a communication device from 1.1.* to 2.2.2.*.

The Station Forms

The station form 500 comprises the following fields: a field 504 identifying the station or communication device for which the form is created, a field 508 providing the ELIN for the identified station/device, a field 512 indicating the whether an emergency call uses the extension of the device ("Extension") or whether the ELIN for the identified station/device ("Nearby"). After a communication device is moved to a different extension, a system administrator may update the ALI database with the new extension's physical location and change the fields 508 and 512 to match the extension's new IP subnetwork.

In one configuration, the form is updated whenever a communication device registers. In other words, whenever a communication device registers, the ELIN derived from the emergency location table for the registering device's address is stored in the device's corresponding form in the field 508. The field value is retained in the event the device later unregisters. Whenever a communication device re-registers, the switch/server compares the ELIN as derived from the table (based on the communication device's current address) with the ELIN that the communication device had in the form from the prior registration. This configuration is discussed in more detail below.

The Operation of the Emergency Locating Agent

Figure 3:
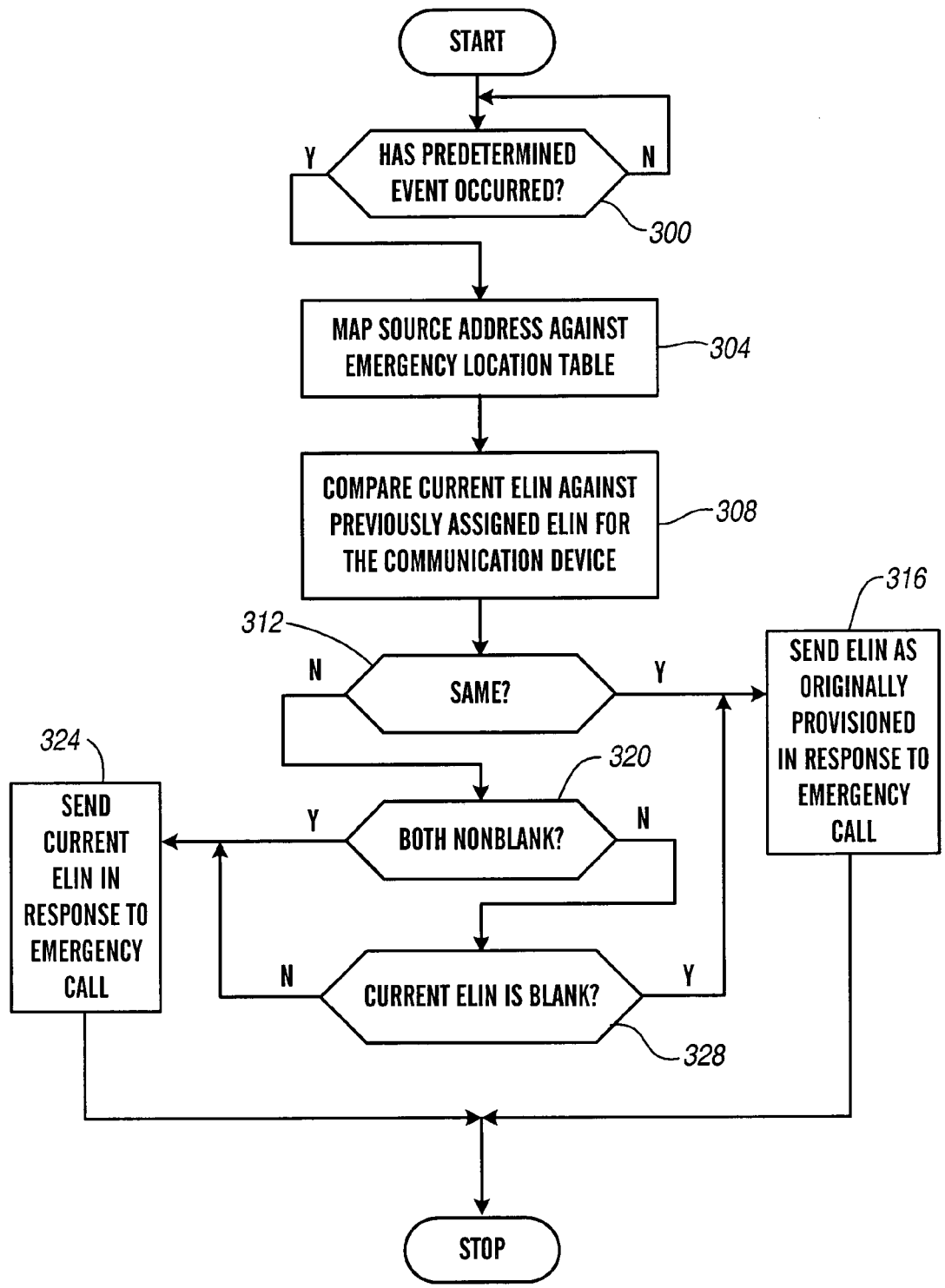
FIG. 3 is a flow chart of the operation of the emergency locating agent according to an embodiment of the present invention.

FIG. 3 depicts the operation of the emergency locating agent according to an embodiment of the present invention. Although not depicted, the steps described herein can apply to proprietary digital protocol enabled telephones.

In decision diamond 300, the agent determines whether a predetermined event has occurred. The agent periodically determines or is notified of the occurrence of the predetermined event. The predetermined event can be the receipt of a call to a universal emergency number and/or the registration or attempted registration of a communication device. If the predetermined event has not occurred, the agent later repeats decision diamond 300. If the predetermined event has occurred, the agent proceeds to step 304.

In step 304, the source address of the calling/registering device is mapped against the emergency location table. The address range encompassing the source address is determined by identifying the beginning and ending IP addresses sandwiching the source address. The corresponding ELIN is then identified. As used herein, "mapping" refers to any process used to determine the ELIN corresponding to a selected source address.

In step 308, the ELIN identified in step 304 is compared to the ELIN in the form corresponding to the source address. In decision diamond 312, it is determined whether the two ELINs are the same.

If the ELINs are the same, the agent proceeds to step 316. When an emergency call has been received, the agent sends the ELIN in the form and emergency location table to the central office. As will be appreciated, the agent could instead send the user's own (currently assigned) ELIN and not the ELIN listed in the table. In this latter configuration, when the communication device is registering, nothing is done. Stated another way, no change is made to the ELIN fields in the table or the form. This is so because the communication device has likely not moved at all or at most moved within the same subnet.

If the ELINs are different, the agent proceeds to decision diamond 320. In decision diamond 320, the agent determines whether both of the ELIN fields in the table and form are nonblank (contain values other than zeros). If both of the fields contain nonzero values, the agent proceeds to step 324 as the communication device is deemed to have moved from one subnet to another because it has a different address than when previously configured. If one of the fields contains a zero value, the agent proceeds to decision diamond 328 discussed below. The fields may be blank for any number of reasons. For example, the field 508 in the form 500 could be blank because system administration does not want the communication device to use the entry in this field as an ELIN.

In step 324, the agent forwards to the central office the ELIN in the form rather than that in the table. In a configuration where the device is registering, the ELIN value from the table is internally stored in the ELIN field in the form. The local emergency calls field is changed to "nearby". An appropriate notification message is forwarded to system administration regarding the move.

In decision diamond 328, the agent determines if the ELIN field in the form is blank. If so, the agent proceeds to step 316. A blank field in the form blank indicates that the system administrator expects the caller to be located outside of the location area network served by the switch/server. If the field in the form is not blank, the agent proceeds to step 324 discussed above.

In the configuration where the mapping is done during registration of the communication device, the ELIN that is forwarded to the PSAP when an emergency call is received is the ELIN in the form.

In another embodiment, the agent handles automatic alerting of dropped emergency calls. Automatic alerting permits emergency personnel who will call back when a call is dropped not only to have priority but also to direct the call to the communication device that placed the call rather than to the ELIN, which may be a different communication device located physically nearby the calling communication device. When an emergency call is dropped, the agent starts an emergency call forwarding timer (not shown). While the timer is running, an incoming trunk call to the extension equivalent to the ELIN that was sent by the emergency call rings as a priority call at the corresponding communication device. When the timer has expired or equals or exceeds a predetermined time period, high priority call forwarding is discontinued. Alternatively, the emergency call may ring at both the extension (communication device) equivalent to the ELIN and as well as the extension (communication device) that dialed or originated the emergency call, or dialed 911 in the U.S. In this configuration, in the event that multiple communication devices dialed "911" while the timer is running, each of the devices could be rung by the agent. Unlike the previous implementation, this implementation rings more than just one 911 call originating communication device at a time. Simultaneously ringing several communication devices can cover all simultaneous 911 calls. When the timer has expired or equals or exceeds a predetermined time period, high priority call forwarding is discontinued.

For example, when an incoming ISDN tie trunk provides both the calling party number and the location identification number and switch has identified the incoming call as an emergency call (e.g., to "911" in the U.S.) and if the call drops, the switch/server will start the emergency call forwarding timer. While the timer is running, an incoming public network trunk call to the ELIN is forwarded to the calling party number provided by the ISDN trunk.

In another embodiment, the Emergency Responder™ approach and the approach of the present invention are combined to provide an emergency location system having advantages over both systems taken alone. In the combined approach, in step 300 the predetermined event is deemed to occur when an emergency call is received and when the elapsed time since the last query by the emergency responder to the switch/server is equal to or in excess of a selected time interval. If the expired time since the last query is equal to or in excess of the selected time interval, the switch/server performs steps 304, 308, 312, 316, 320, 324, and 328 as described above. If the expired time since the last query is less than the selected time interval, the switch/server queries the emergency responder for the location information associated with the address of the calling communication device and forwards the location information to the PSAP.

A number of variations and modifications of the invention can be used. It would be possible to provide for some features of the invention without providing others.

For example in one alternative embodiment, the agent noted above is implemented by a logic circuit, such as an ASIC, or by a combination of software and a logic circuit.

In another alternative embodiment, the communication protocols used by the various communication media 214, 216, 218, and 220 can be any suitable protocol. Examples include proprietary digital, Asynchronous Transfer Mode, Integrated Services Digital Network Primary Rate Interface (ISDN PRI), Integrated Services Digital Network Basic Rate Interface (ISDN BRI), H.323, and SIP.

In another alternative embodiment, the emergency location table can have address sets including any kind of OSI Layer 3 addresses, in addition to or in lieu of IP addresses. Thus, the table need not have a subnet mask field.

In another alternative embodiment, the set of addresses can be other OSI Layer 3 or Network Layer addresses besides IP addresses, such as a circuit-switched telephone port address. As will be appreciated, such addresses may also be defined or reside in a layer adjacent to Layer 3, such as Layer 2 or Layer 4. The use of IP addresses in the exemplary embodiment is not intended to limit the addresses in the defined sets of addresses to IP addresses.

In another alternative embodiment, the sets of addresses are not ranges of addresses. Rather, the sets of addresses can include a defined collection or ordering of addresses which may or may not define a subnetwork.

In yet another alternative embodiment, a selected member address corresponds to more than one ELIN. This is particularly useful where a signaling protocol can signal multiple ELINs.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing emergency location information to an emergency service provider, comprising:
   providing at least one set of Network Layer addresses, the at least one set of Network Layer addresses comprising at least one Network Layer address, and at least one Emergency Location Information Number (ELIN) corresponding to the at least one set of Network Layer addresses; and
   upon the occurrence of a predetermined event, mapping, by a processor, a selected Network Layer address against the at least one set of Network Layer addresses to determine an ELIN for the selected Network Layer address.

2. The method of claim 1, wherein, in each set of addresses, a corresponding one of the plurality of ELINs is common to a plurality of addresses, wherein each ELIN corresponds to an emergency response location, and wherein, for a selected ELIN, the corresponding set of addresses correspond to communication devices located physically in the emergency response location.

3. The method of claim 1, wherein the predetermined event is the registration of a communication device.

4. The method of claim 1, wherein the predetermined event is the receipt of an emergency call and further comprising:
   forwarding the ELIN identified in the mapping step to a public safety answering point.

5. The method of claim 4, further comprising:
   determining, by a processor, a currently assigned ELIN for the calling address; and
   comparing, by a processor, the currently assigned ELIN against the ELIN identified in the mapping step.

6. The method of claim 5, wherein, when the currently assigned ELIN is identical to the ELIN identified in the mapping step, not performing the forwarding step.

7. The method of claim 5, wherein, when the currently assigned ELIN is different from the ELIN identified in the mapping step, performing the forwarding step.

8. The method of claim 5, wherein, when there is no currently assigned ELIN, performing the forwarding step.

9. The method of claim 5, when there is no corresponding ELIN for the set of addresses including the calling address, not performing the forwarding step.

10. The method of claim 5, wherein the currently assigned ELIN is assigned when a communication device registers.

11. The method of claim 1, wherein each of the sets of addresses is a range of address that defines a corresponding subnetwork.

12. The method of claim 1, wherein each address in a selected set of addresses has a common ELIN and further comprising:
   forwarding an ELIN corresponding to the selected Network Layer address to a public safety answering point.

13. The method of claim 1, wherein at least some of the addresses in the at least one set of addresses is an address in a distributed processing network.

14. The method of claim 13, wherein the at least some of the addresses are IP addresses.

15. The method of claim 1, wherein the selected address is an address in a data processing network.

16. The method of claim 1, wherein the selected address is an IP address.

17. The method of claim 1, wherein the predetermined event is the receipt of a first communication directed to an emergency service provider's public safety answering point and further comprising, when the first communication is terminated before the emergency service provider's public safety answering point staff has collected all the information that they need, receiving a second communication to the ELIN and alerting the address that initiated the first communication and the ELIN of the second communication.

18. A communication system for providing emergency location information to an emergency service provider, comprising:
   a processor readable memory comprising at least one set of Network Layer addresses, the at least one set of Network Layer addresses comprising at least one Network Layer address, and at least one set of Emergency Location Information Numbers (ELINs) comprising at least one Emergency Location Information Number (ELIN), the at least one set of ELINs corresponding to the at least one set of Network Layer addresses; and
   an emergency locating agent operable, upon the occurrence of a predetermined event and when executed by a processor, to map a selected Network Layer address against the at least one set of Network Layer addresses to determine an ELIN in the corresponding at least one set of ELINs for the selected Network Layer address.

19. The system of claim 18, wherein each set of addresses contains more members than a corresponding set of ELINs, wherein each ELIN corresponds to an emergency response location, and wherein, for a selected ELIN, the corresponding set of addresses correspond to communication devices located physically in the emergency response location.

20. The system of claim 18, wherein the predetermined event is the registration of a communication device associated with the selected address.

21. The system of claim 18, further comprising:
   an input operable to receive an emergency call from a calling address
   and wherein the selected address is the calling address and wherein the agent is operable to (b) forward the ELIN identified in the mapping step to a public safety answering point.

22. The system of claim 21, wherein the agent is further operable to (c) determine a currently assigned ELIN for the calling address and (d) compare the currently assigned ELIN against the ELIN identified in the mapping step.

23. The system of claim 22, wherein, when the currently assigned ELIN is identical to the ELIN identified in the mapping step, the agent does not perform the forwarding function but sends to the public safety access point the currently assigned emergency location extension.

24. The system of claim 22, wherein, when the currently assigned ELIN is different from the ELIN identified in the mapping step, the agent performs the forwarding function.

25. The system of claim 22, wherein, when there is not currently assigned ELIN, the agent performs the forwarding step.

26. The system of claim 22, wherein, when there is no corresponding ELIN for the set of addresses including the calling address, the agent does not perform the forwarding step.

27. The system of claim 22, wherein the currently assigned ELIN is assigned when a communication device registers.

28. The system of claim 18, wherein the at least one set of addresses is a range of addresses that defines a corresponding subnetwork.

29. The system of claim 18, wherein each address in a selected set of addresses has a common ELIN and the agent is further operable to forward the ELIN corresponding to the selected Network Layer address to a public safety answering point.

30. The system of claim 18, wherein at least some of the addresses in the at least one set of addresses is an address in a distributed processing network.

31. The system of claim 29, wherein the at least some of the addresses are IP addresses.

32. The system of claim 18, wherein the selected address is an address in a data processing network.

33. The system of claim 18, wherein the selected address is an IP address.

34. A communication system comprising:
a processor; and
a memory, the memory being encoded with an emergency location table readable by the processor, the emergency location table comprising:
   a plurality of sets of Open Systems Interconnect Layer 3 addresses, each set of Layer 3 addresses comprising a plurality of Layer 3 addresses; and
   a plurality of Emergency Location Information Numbers (ELINs), each Emergency Location Information Number (ELIN) corresponding to a respective set of Layer 3 addresses stored in the memory.

35. The system of claim 34, wherein each set of Layer 3 addresses contains more members than a corresponding set of ELINs, wherein each ELIN corresponds to an emergency response location, and wherein, for a selected ELIN, the corresponding set of addresses correspond to communication devices located physically in the emergency response location.

36. The system of claim 34, wherein, in each set of addresses, a corresponding one of the set of ELINs is common to a plurality of addresses.

37. The system of claim 34, wherein each of the sets of addresses is a range of addresses that defines a corresponding subnetwork.

38. The system of claim 34, wherein each address in a selected set of addresses has a common ELIN.

39. The system of claim 34, wherein at least some of the addresses in each of the plurality of sets of addresses is an address in a distributed processing network.

40. The system of claim 34, wherein the at least some of the addresses are IP addresses.

41. The system of claim 34, further comprising:
a subnet identifier for each set of addresses, each subnet identifier identifying uniquely a subnetwork containing the respective set of addresses.

42. A method for handling dropped emergency calls, comprising:
(a) receiving, from a first communication device and by a port, a first communication to one of an emergency service provider and a public safety answering point;
(b) determining, by an emergency locating agent executed by a processor, an Emergency Location Information Number (ELIN) by mapping a source address of the first communication device against address ranges in an emergency location table, wherein the source address and addresses in the range of addresses are Open Systems Interconnect Layer 3 addresses;
(c) forwarding, by the processor, the ELIN to the one of an emergency service provider and public safety answering point;
(d) receiving, by a trunk, a second communication from the one of the emergency service provider and public safety answering point; and
(e) directing, by the processor, the second communication to an address associated with the first communication device and to the ELIN identified in step (b).

* * * * *

UNITED STATES PATENT AND TRADEMARK OFFICE
CERTIFICATE OF CORRECTION

PATENT NO. : 7,627,091 B2
APPLICATION NO. : 10/607414
DATED : December 1, 2009
INVENTOR(S) : Becker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1825 days.

Signed and Sealed this

Second Day of November, 2010

David J. Kappos
*Director of the United States Patent and Trademark Office*